(12) United States Patent
Zisimopoulos et al.

(10) Patent No.: US 9,572,018 B2
(45) Date of Patent: Feb. 14, 2017

(54) HANDLING A COMMUNICATION TO A USER EQUIPMENT IN A CELLULAR WIRELESS NETWORK

(75) Inventors: Haris Zisimopoulos, London (GB); Erik Guttman, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 102 days.

(21) Appl. No.: 14/123,324

(22) PCT Filed: May 31, 2012

(86) PCT No.: PCT/KR2012/004314
§ 371 (c)(1),
(2), (4) Date: Dec. 20, 2013

(87) PCT Pub. No.: WO2012/165883
PCT Pub. Date: Dec. 6, 2012

(65) Prior Publication Data
US 2014/0099944 A1    Apr. 10, 2014

(30) Foreign Application Priority Data
May 31, 2011    (GB) .................................. 1109083.4

(51) Int. Cl.
*H04W 8/22*    (2009.01)
*H04W 88/06*    (2009.01)
(Continued)

(52) U.S. Cl.
CPC ................. *H04W 8/22* (2013.01); *H04W 4/12* (2013.01); *H04W 60/00* (2013.01); *H04W 68/12* (2013.01);
(Continued)

(58) Field of Classification Search
CPC ........ H04W 88/02; H04W 4/16; H04W 64/00; H04W 68/005; H04W 68/02; H04W 68/12; H04W 68/025; H04W 8/245; H04W 88/06; H04W 76/02; H04W 60/04; H04W 52/02; H04W 4/20; H04M 1/7253; H04M 1/72533; H04M 1/72527; H04M 1/72519
See application file for complete search history.

(56) References Cited

U.S. PATENT DOCUMENTS

2004/0002330 A1* 1/2004 Chitrapu ............... H04W 48/16
                                                    455/426.2
2005/0208966 A1    9/2005 David et al.
(Continued)

FOREIGN PATENT DOCUMENTS

EP    1 578 095 A1    9/2005
EP    1 750 465 A2    2/2007
(Continued)

*Primary Examiner* — George Eng
*Assistant Examiner* — Umair Ahsan
(74) *Attorney, Agent, or Firm* — Jefferson IP Law, LLP (57) ABSTRACT

User apparatus 2 in a cellular wireless network 14 comprises a user equipment 4 having a first network interface 6 comprising a radio transceiver 8 for communicating via the cellular wireless network 14. The radio transceiver 8 may be set to a first state or to a second state. The user apparatus 2 has a second network interface 10 to a second network 16. A call to the user apparatus 2 is handled by detecting, via the second network interface 10, a request to receive a communication and dependent on the detection of the request via the second network interface 10, switching the radio transceiver 8 to the second state. The communication is then received at the user equipment 4 via the radio transceiver 8. As a result, the user equipment may receive the communication via the cellular wireless network without the need for the user equipment to be continuously camped on the
(Continued)

cellular wireless network, so that the cellular wireless network may reduce provisioning of network resources and so reduce power consumption.

25 Claims, 7 Drawing Sheets

(51) Int. Cl.
*H04W 68/12* (2009.01)
*H04W 4/12* (2009.01)
*H04W 60/00* (2009.01)
*H04W 4/14* (2009.01)

(52) U.S. Cl.
CPC ............... *H04W 88/06* (2013.01); *H04W 4/14* (2013.01); *Y02B 60/50* (2013.01)

(56) References Cited

U.S. PATENT DOCUMENTS

| | | |
|---|---|---|
| 2006/0126582 A1 | 6/2006 | Saifullah et al. |
| 2007/0032265 A1 | 2/2007 | Park |
| 2007/0091836 A1* | 4/2007 | Oprescu-Surcobe et al. ............... 370/318 |
| 2007/0223516 A1* | 9/2007 | Dunn et al. ................ 370/462 |
| 2008/0207230 A1 | 8/2008 | Jung et al. |
| 2009/0124254 A1* | 5/2009 | Witzel et al. ............. 455/435.1 |
| 2009/0221261 A1 | 9/2009 | Soliman |
| 2009/0258672 A1 | 10/2009 | Camp, Jr. et al. |
| 2010/0103829 A1* | 4/2010 | Murzeau et al. ............ 370/252 |
| 2011/0080899 A1* | 4/2011 | Delker et al. ................ 370/338 |
| 2011/0195743 A1* | 8/2011 | Jee et al. ..................... 455/522 |
| 2011/0269502 A1* | 11/2011 | Clark et al. ................ 455/552.1 |
| 2012/0190351 A1* | 7/2012 | Tian et al. ................... 455/417 |
| 2013/0034060 A1* | 2/2013 | Lu et al. ...................... 370/328 |

FOREIGN PATENT DOCUMENTS

| | | |
|---|---|---|
| JP | 2008-258809 A | 10/2008 |
| KR | 10-2006-0034569 A | 4/2006 |
| KR | 10-2007-0080060 A | 8/2007 |
| KR | 10-0833896 B1 | 6/2008 |
| WO | 2006/061692 A3 | 6/2006 |
| WO | 2009/111178 A1 | 9/2009 |

* cited by examiner

HANDLING A COMMUNICATION TO A USER EQUIPMENT IN A CELLULAR WIRELESS NETWORK

TECHNICAL FIELD

The present invention relates generally to a method and apparatus for handling a communication to a user equipment in a cellular wireless network, and more specifically, but not exclusively, to a method and apparatus for handling a communication to a user equipment having a cellular radio transceiver that may be set to different states.

BACKGROUND ART

Cellular wireless networks typically comprise user equipments (UE) such as mobile handsets which may communicate via a network interface comprising a radio transceiver to a network of base stations connected to a telecommunications network. Such cellular wireless networks have undergone rapid development through a number of generations of radio access technology. The initial deployment of systems using analogue modulation has been superseded by second generation (2G) digital systems such as GSM (Global System for Mobile communications), typically using GERA (GSM Enhanced Data rates for GSM Evolution Radio Access) radio access technology, and these systems have themselves been replaced by or augmented by third generation (3G) digital systems such as UMTS (Universal Mobile Telecommunications System), using the UTRA (Universal Terrestrial Radio Access) radio access technology. Third generation standards provide for a greater throughput of data than is provided by second generation systems; this trend is continued with the proposals by the Third Generation Partnership Project (3GPP) of the Long Term Evolution (LTE) system, using E-UTRA (Evolved UTRA) radio access technology, which offers potentially greater capacity and additional features compared with the previous standards.

A user equipment may have an interface to a second network, in addition to having an interface to cellular wireless network, which may be used for example to connect via a wireless link such as IEEE 802.11 WiFi to a wireless access point in a data network. The wireless link may be used, for example, for to provide a data connection such as an Internet connection. In some situations, such as in an aeroplane, the transceiver for communicating via the cellular wireless network may be disabled and the user may communicate using the WiFi link.

However, in many situations there is a tendency for users to keep the cellular radio transceiver enabled continuously, so that the user may receive calls or text messages using the cellular network. As a result, many user equipments remain continuously camped on the cellular wireless network, even at times when the user is unlikely to make a call, such as at night. The provisioning of wireless network infrastructure, such as base station transceivers, has to be sufficient to handle the signalling involved with a large number of user equipments which are continuously camped on the network. Even when a user equipment is not making or receiving a call, it may be required to send periodic idle mode signalling, such as periodic location area updates or routing area updates.

Increasingly, network operators are striving to reduce the power consumption of cellular wireless networks, and in order to do this, it is beneficial to reduce the number of network elements, in particular wireless transceivers, that are powered up in less busy times. However, the large number of user equipments that are continuously camped on the network reduces the scope for powering down network elements. The load on the conventional, high power consumption, cellular macrocell base stations may be reduced by the provisioning of low power femtocell base stations within the cellular network at user premises, to which a user equipment may handover when the user is at home. Alternatively, the user may turn off the user equipment so that incoming messages are dealt with by voice mail.

DISCLOSURE OF INVENTION

Technical Problem

However, many users prefer to be able to receive calls at any time and many premises are not equipped with a femtocell base station.

It is an object of the invention to ameliorate the problems with the prior art systems.

Solution to Problem

In accordance with a first aspect of the present invention, there is provided a method of handling a communication to user apparatus in a cellular wireless network, said user apparatus comprising a user equipment, the user equipment having a first network interface comprising a radio transceiver for communicating via the cellular wireless network and the user apparatus having a second network interface to a second network, wherein the radio transceiver may be set to a first state or to a second state, the method comprising:

setting the radio transceiver to the first state;

detecting, via the second network interface, a request to receive a communication;

dependent on the detection of the request via the second network interface, switching the radio transceiver to the second state; and receiving the communication at the user equipment via the radio transceiver.

This has an advantage that the user equipment may receive the communication via the cellular wireless network without the need for the user equipment to be continuously camped on the cellular wireless network, so that the cellular wireless network may reduce provisioning of network resources and so reduce power consumption. In addition, power consumption of the user apparatus may be reduced when the transceiver is set to the first state where the first state is a lower power consumption state such as a disabled state.

In an embodiment of the invention, the second network interface comprises a further radio transceiver for communicating via a wireless link to the second network. The wireless link may operate according to IEEE 802.11. This may provide a convenient link by which the user equipment may receive the request to receive a communication.

In an alternative embodiment of the invention, the second interface comprises a fixed line network interface for communicating via a fixed line to the second network. This has an advantage that the user equipment may receive the request when a wireless link to a second network is not available or is unreliable.

In an embodiment of the invention, the user equipment has an identifier, such as a phone number, in the cellular wireless network. The communication may comprise a call addressed to the identifier of the user equipment and/or a data message such as a short messaging service (SMS) message.

In an embodiment of the invention, the method comprises providing a client function in the user apparatus and detecting the request to receive the communication using the client function, the request to receive the communication having been sent to the client function from a server. The provision of a client function, which may be called a call handing surrogate client, for communication with a server, which may be called a call handing surrogate server, provides a convenient way of sending and receiving the request via the second network.

In an embodiment of the invention, the method comprises sending a message from the client function to the server requesting registration and registering the server with a mobility controller associated with the cellular wireless network to handle calls related to the user equipment. Calls to the user equipment may be handled by the server, which may alert the client to an incoming call, so that the client may request that the radio transceiver for communication via the cellular wireless network be enabled. This has an advantage that calls to the user equipment may be received via the cellular network without the radio transceiver being enabled at the time the alert is received.

In an embodiment of the invention, the client function is provided by a software application at the user equipment. This has an advantage that the user apparatus may comprise the user equipment with no need for a further device.

In an embodiment of the invention, the user apparatus comprises the user equipment and a device associated with the user equipment and the method comprises detecting, at said device, the request to receive the communication and sending a message from said device to the user equipment indicating that the request has been detected. This has an advantage that the functionality to detect the request, such as a call handling surrogate client, need not be installed in the user equipment. For example, the device may be a docking station and/or a battery charger, and may have a fixed line link to the second network.

In an embodiment of the invention, the method comprises sending the message from said device to the user equipment using a Digital European Cordless Telephone (DECT) link. This has an advantage of providing a convenient link to the user equipment, for example from a fixed line.

In an embodiment of the invention, the request to receive the communication specifies a type of communication to receive, and said sending of the message from said device to the user equipment indicates that the request is of the specified type. For example, the type of communication may be a call to the user equipment rather than a text message. This has the advantage that enabling of the radio receiver may be selective according to the type of communication.

In an embodiment of the invention, the radio transceiver is disabled in the first state and enabled in the second state. An advantage of setting the radio transceiver to a disabled state is that power consumption may be reduced.

In an embodiment of the invention, the method comprises, after switching the radio transceiver to the second state, and before receiving the communication at the user equipment, sending a message using the first network interface radio transceiver to register the user equipment to a mobility controller associated with the cellular wireless network to handle calls related to the user equipment. This has an advantage of allowing the user equipment to camp on to the cellular wireless network to receive the communication. A location area update may be performed to camp on to the cellular wireless network.

In an embodiment of the invention, the method comprises sending an indication from the user equipment to the mobility controller, for example a Mobile Switching Centre (MSC), indicating that the communication should be handled on a priority basis. This may be for example a flag indicating that the communication is terminated by a call handling surrogate client function. Dependent on receipt of said indication at the mobility controller, an authentication process for the user equipment may be accelerated. This has an advantage of reducing delay in terminating the communication at the user equipment.

In an embodiment of the invention, the mobility controller supports mobile terminated roaming retry (MTRR) or mobile terminated roaming forwarding (MTRF). The request to receive the communication may have been sent to the client function from a server supporting mobile terminated roaming retry (MTRR) or mobile terminal roaming forwarding (MTRF), and the method may comprise sending a message from said server supporting mobile terminated roaming retry (MTRR) or mobile terminated roaming forwarding (MTRF) to a home location register (HLR), the message indicating a mobile station roaming number (MSRN) of the user equipment. This has an advantage of allowing the user equipment to avoid mobile terminated call timeout and to camp on to the cellular wireless network.

In an embodiment of the invention, the method comprises delaying sending the request to receive the communication from the server system in dependence on a delay setting associated with the communication. The delay setting may be associated with a type of communication, and the method may comprise delaying the switching of the radio transceiver to the second state after the detection of the request in dependence on a delay setting associated with the communication. This has an advantage that receipt of the communication, for example a data message, may be delayed, for example, to a time convenient to the user.

In an embodiment of the invention, said delaying of the switching of the radio transceiver may be in dependence on the request being of a specific type. This has an advantage that, for example, data messages may be delayed while a voice or video call may be not delayed.

In an embodiment of the invention, said delay setting is configured in dependence on a user preference relating to the receipt of communications. This has the advantage that a user may select, for example, when and how often to receive data messages.

In an embodiment of the invention, said delay setting is configured for delivery of short messaging service (SMS) messages.

In accordance with a second aspect of the present invention, there is provided user apparatus for receiving a communication in a cellular wireless network, said user apparatus comprising a user equipment, the user equipment having a first network interface comprising a radio transceiver for communicating via the cellular wireless network and the user apparatus having a second interface to a second network, wherein the radio transceiver may be set to a first state or to a second state, the user apparatus being configured to:

set the first radio transceiver to the first state;

detect, via the second network interface, a request to receive a communication;

dependent on the detection of the request via the second network interface, switch the radio transceiver to the second state; and receive the communication at the user equipment via the radio transceiver.

In accordance with a third aspect of the present invention, there is provided user equipment for receiving a communication in a cellular wireless network in association with a user device, the user equipment having a first network interface comprising a radio transceiver for communicating via the cellular wireless network and the user device having a second interface to a second network, wherein the radio transceiver may be set to a first state or to a second state, the user equipment being configured to:

set the first radio transceiver to the first state;

receive a message from the user device indicating that a request to receive a communication has been detected via the second network interface;

dependent on reception of said message, switch the radio transceiver to the second state; and receive the communication via the radio transceiver.

Further features and advantages of the invention will be apparent form the following description of preferred embodiments of the invention, which are given by way of example only.

Advantageous Effects of Invention

The present invention has an advantage that the user equipment may receive the communication via the cellular wireless network without the need for the user equipment to be continuously camped on the cellular wireless network, so that the cellular wireless network may reduce provisioning of network resources and so reduce power consumption.

MODE FOR THE INVENTION

By way of example an embodiment of the invention will now be described in the context of a cellular wireless operating according to circuit switched procedures associated with UMTS networks. However, it will be understood that this is by way of example only and that other embodiments may involve wireless communication systems operated according to packet switched procedures, such as Internet Protocol Multimedia Subsystem (IMS) procedures, as associated with LTE networks. Furthermore, embodiments are not limited to the use of a particular cellular radio access technology; other radio access technologies, such as IEEE802.16 WiMax, may be used.

In an embodiment of the invention a cellular radio transceiver in a user equipment may be set to a first state, in a preferred embodiment disabled, for example when a user does not wish to make outgoing calls. The user equipment may be set to a second state, in a preferred embodiment enabled, by means of an alert received by an interface to a second network, for example by a WiFi or fixed line connection, allowing the user equipment to receive a communication, such as a mobile terminated call or a data message, via the cellular radio network. This provides the user with the ability to receive calls and text messages as if the user equipment were camped on the cellular wireless network, but without the need for it to be camped on the network continuously, reducing loading on the cellular wireless network. As a result, the cellular wireless network may reduce provisioning of network resources, such a macro cellular base station transceivers, and so reduce power consumption, with economic and environmental benefits. In addition, power consumption of the user apparatus may be reduced when the transceiver is in the first state.

Figure 1:
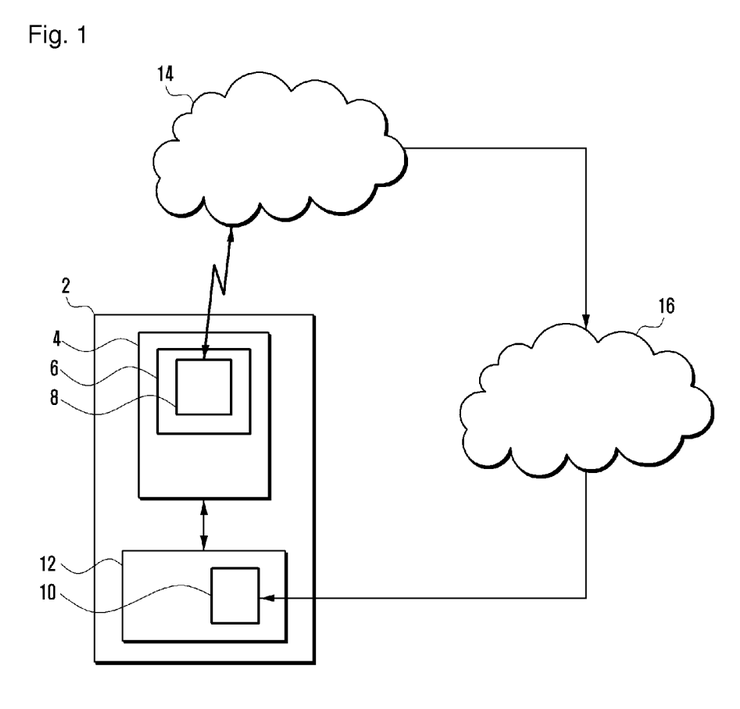
FIG. 1 is a schematic diagram illustrating user apparatus having a first interface for communicating via a cellular wireless network and a second interface to a second network according to an embodiment of the invention.

FIG. 1 illustrates an embodiment of the invention. A user apparatus 2 is in a cellular wireless network 14, 2, said user apparatus 2 comprising a user equipment 4, such as a mobile phone handset. In addition, as shown in FIG. 1, the user apparatus may comprise a device 12, such as a docking station or charger, that may be connected to the user equipment 4. The user equipment 4 has a first network interface 6 comprising a radio transceiver 8, referred to herein as a primary radio transceiver, for communicating via the cellular wireless network. The user apparatus also has a second network interface 10 to a second network 16. As shown in FIG. 1, the second network interface may be located in the device 12 such as the docking station or charger that is part of the user apparatus. Alternatively, the second network interface may be within the user equipment 4. The second network interface may comprise a further radio transceiver, referred to herein as a further radio transceiver, for communicating via a wireless link, which may be a WiFi link operating to according to IEEE 802.11, to the second network 16. Handsets may be provided with a WiFi interface as standard, or a WiFi interface may be provided in the device 12 that is part of the user apparatus. In an alternative embodiment of the invention, the second interface may comprise a fixed line network interface for communicating via a fixed line to the second network.

The primary radio transceiver 8 may be set to a first state or to a second state. The first state may be a continuously disabled state, in which for example all or parts of the transceiver may be turned off until the disabled state is changed to an enabled state, or it may be an intermittently disabled state, in which for example all or parts of the transceiver may be turned off for a majority of the time but intermittently turned on, for example at regular intervals, at least part of the time until the disabled state is changed to an enabled state. The first state is in any case preferably a low power consumption state, compared to the second state.

The primary radio transceiver 8 may be set to the first state when the user of the user equipment does not wish to make outgoing calls, for example when the user is at home and has another way of making outgoing calls such as a fixed line or internet connection. For example, the user equipment may be connected to a charger or docking station.

When the transceiver is in the first state, a communication to the user apparatus may be initiated. The user equipment 4 may have an identifier, such as a phone number, in the cellular wireless network, and the communication may comprise a call addressed to the identifier of the user equipment or a data message such as a short messaging service (SMS) message. However, while the primary radio transceiver 8 is in the first state, the user equipment is not able to receive the communication via the first interface, that is to say the communication cannot be received as a communication via the cellular wireless network.

A request to receive a communication, that is to say an alert, is sent via the second network to the second network interface. This may be send by a fixed line or by a wireless link, such WiFi or other wireless link such as Bluetooth. The request is detected, via the second network interface, and dependent on the detection, the primary radio transceiver 8 is switched to the second state, that is to say the primary radio transceiver 8 is enabled.

Once the primary radio transceiver 8 is enabled, the communication may be received at the user equipment via the primary radio transceiver. This enables the user equipment to receive the communication via the cellular wireless network, but without the need for the user equipment to be continuously camped on the cellular wireless network. As a consequence of this, the cellular wireless network may reduce provisioning of network resources and so reduce power consumption. In particular, the number of active fixed cellular radio transceivers, and particularly transmitter power amplifiers, may be reduced. In addition, power consumption of the user apparatus may be reduced when the primary radio transceiver 8 is set to the first state where the first state is a lower power consumption state such as a disabled state.

In an embodiment of the invention, a client function, that may be called a Call Handling Surrogate Client, may be provided in the user apparatus and a server, that may be called a Call Handling Surrogate Server, may be provided connected to the cellular wireless network. The client function may be, for example, a software application installed in the user equipment, or may be installed in a device which forms part of the user apparatus, such as the docking station or charger. The request to receive the communication may be sent to the client function via the second network from the server, and the request may be detected using the client function.

When the primary radio transceiver 8 is disabled, whether continuously or intermittently, the client function may send a message to the server requesting registration and registering the server with a mobility controller, which may be a Mobility Switching Centre (MSC) associated with the cellular wireless network, to handle calls related to the user equipment. The user equipment may be de-registered from the mobility controller. Calls to the user equipment may then be handled by the server. The Server may alert the client to an incoming call, so that the client may request that the primary radio transceiver 8 be enabled for communication via the cellular wireless network. In this way, calls to the user equipment may be received via the cellular network without the primary radio transceiver 8 being continuously enabled, and the use of the client function and server allows the call handling to be transparent to an operator of the cellular wireless network, that is to say the signalling procedures in the cellular wireless network may not need to be modified.

In an embodiment of the invention in which the user apparatus comprises the user equipment and a device associated with the user equipment such as a docking station or charger, the request to receive the communication may be detected at the device rather than at the user equipment and a message may be sent from the device to the user equipment indicating that the request has been detected. In this case, the functionality to detect the request, such as a call handling surrogate client, need not be installed in the user equipment. The request to receive the communication may specify a type of communication to receive, and the message from the device to the user equipment may indicate that the request is of the specified type. For example, the type of communication may be a call to the user equipment rather than a text message. This has the advantage that enabling of the primary radio transceiver 8 may be selective according to the type of communication. In an embodiment of the invention, the message sent from the device to the user equipment may use a Digital European Cordless Telephone (DECT) link. This has an advantage of providing a convenient link to the user equipment, for example from a fixed line. The user equipment may, for example, be equipped with a DECT radio transceiver, which is registered to a DECT base station connected, for example, to the fixed line.

After enabling the primary radio transceiver 8, that is to say switching it to the second state, the user equipment may be re-registered to a mobility controller so that it may receive the communication to which it has been alerted. This may be achieved by sending a message using the primary radio transceiver 8 to register the user equipment to the mobility controller associated with the cellular wireless network to handle calls related to the user equipment. This allows the user equipment to camp on to the cellular wireless network to receive the communication. A location area update may be performed to camp on to the cellular wireless network. The camping should preferably be performed quickly so as not to cause undue delay in connecting the call, and to assist with this an indication may be sent from the user equipment to the mobility controller indicating that the communication should be handled on a priority basis. This may be for example a flag indicating that the communication is terminated by a call handling surrogate client function. Dependent on receipt of said indication at the mobility controller, an authentication process for the user equipment may be accelerated. This has an advantage of reducing delay in terminating the communication at the user equipment.

In order to avoid call timeout, the existing feature of roaming retry may be used, in cases where the mobility controller supports mobile terminated roaming retry (MTRR) or mobile terminated roaming forwarding (MTRF). The call handling surrogate server is also arranged to support mobile terminated roaming retry (MTRR) or mobile terminal roaming forwarding (MTRF), and a message is sent from the server to a home location register (HLR), the message indicating a mobile station roaming number (MSRN) of the user equipment. This may allow the user equipment to avoid mobile terminated call timeout and to camp on to the cellular wireless network.

In particular in the case of receiving a communication that does not need immediate attention, such as a data message, it may be desirable to delay or inhibit enabling of the primary radio transceiver 8. This may be achieved by delaying sending the request to receive the communication from the server system, and/or delaying switching of the primary radio transceiver 8 to the second state after detection of the request, in dependence on a delay setting associated with the communication; a delay setting may depend on the type of communication, for example whether the call is a data message or a voice call. This may be indicated by the request being of a specific type. A data message may be delayed, for example, by a pre-determined period or to a time convenient to the user. The delay setting may be configured in dependence on a user preference relating to the receipt of communications, so that a user may select, for example, when and how often to receive data messages. For example, an application running on the user equipment that is arranged to carry out regular synchronisation with a server over the internet, for example to update emails, may be inhibited or delayed when the user has indicated a preference not to update emails.

An additional advantage of setting the primary radio transceiver 8 to the second state is that, if the user equipment is used to reproduce music or other multimedia content, interference caused by signalling via the transceiver is prevented, which may otherwise cause, for example, interference to an audio channel.

Embodiments of the invention will now be described in more detail.

Figure 2:
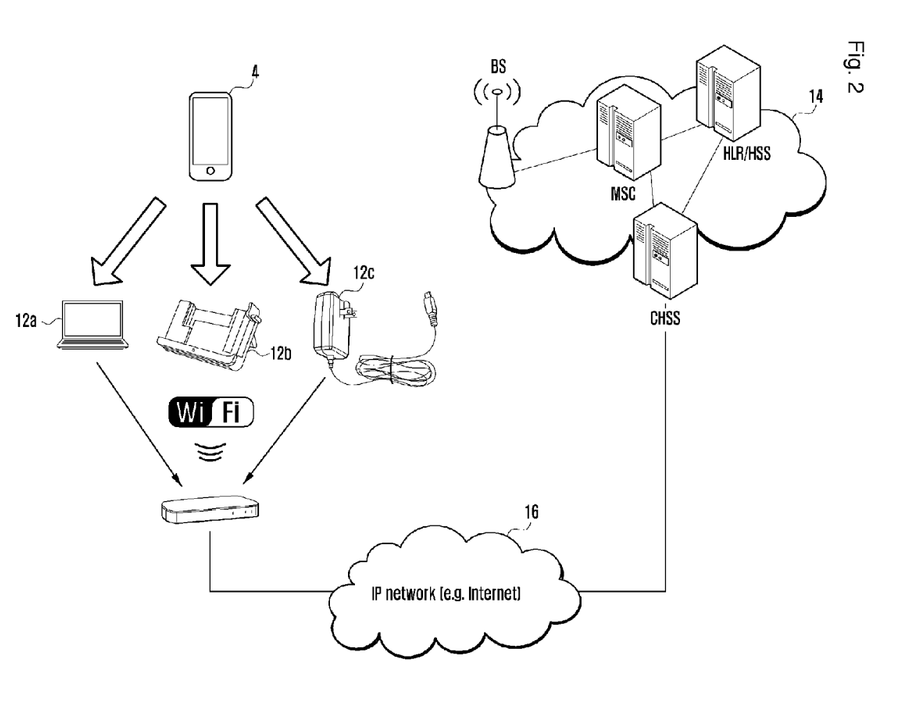
FIG. 2 is a schematic diagram illustrating an embodiment of the invention in which the user apparatus comprises a user equipment and another device to which it may be connected.

As illustrated by FIG. 2, in an embodiment of the invention a user equipment 4, also referred to as a mobile station (MS), may use a client function, that may be called a Call Handling Surrogate Client (CHSC), which may be a software module within the user equipment or may reside in a separate hardware entity such as a mobile phone charger 12c, docking station 12b or computer 12a that would maintain an alternative connectivity to a server residing in the mobile network operator's (MNO) network 14, that is to say the cellular wireless network, and be under the network operator's control and handle the calls on the behalf of the user equipment 4.

Figure 3:
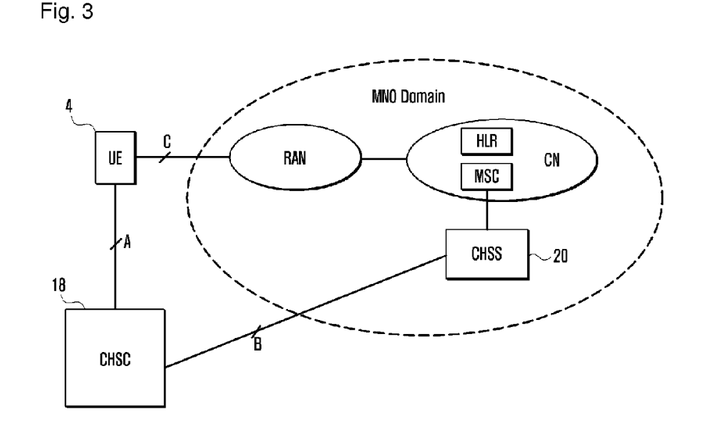
FIG. 3 is a schematic diagram illustrating a network architecture according to an embodiment of the invention.

FIG. 3 illustrates one embodiment of the invention in which the Call Handling Surrogate Client (CHSC) 18 resides in a mobile phone charger or docking station that may set the user equipment 4 to "airplane status" (i.e. disabling the primary radio transceiver 8 of the user equipment, that is to say the radio transceiver for communicating via the cellular wireless network) using interface A as shown. The CHSC may register itself on behalf of the user equipment to the Call Handling Surrogate Server (CHSS) 20 using interface B. Interface B uses for example fixed internet connectivity or WLAN. In general any connectivity that allows the CHSC to contact the CHSS either over the public internet or via a secure tunnel may be used. The user equipment 4 may switch off its primary radio transceiver 8 (interface C to the radio access network (RAN) in the cellular wireless network) and have calls and SMS messages handled via interface B to the CHSC.

Figure 4:
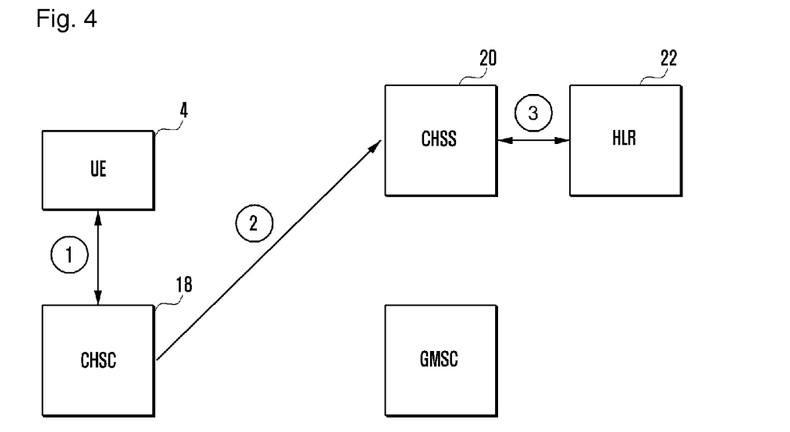
FIG. 4 is a schematic diagram illustrating a registration process according to an embodiment of the invention.

FIG. 4 illustrates a sequence of events related to the registration of the user equipment to use the call handling surrogate client (CHSC) in an embodiment of the invention. At step 1, the user equipment 4 communicates with the CHSC 18 and may provide credentials that allow it to be authenticated. At step 2, the CHSC 18 sends a registration message to the CHSS 20. At step 3, the CHSS 20 registers itself as the node to handle any calls related to this user equipment. In one embodiment of the invention the credentials can be derived from the (U)SIM of the user equipment.

Figure 5:
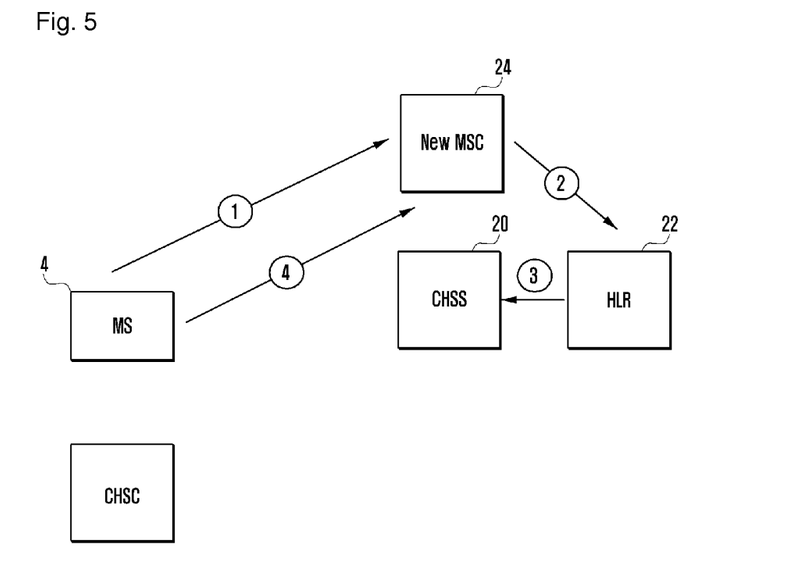
FIG. 5 is a schematic diagram illustrating a mobile originated process according to an embodiment of the invention.

FIG. 5 illustrates a procedure for handling mobile originated calls in an embodiment of the invention. The user equipment 4 uses a normal bootstrap procedure at step 1 which effectively registers it to the MSC 24 in the location area in which it resides. A trigger to disable the connection from the CHSC may be provided, if necessary. In embodiments of the invention, for handling of mobile originated calls, the user may manually remove the coupling with the CHSC or some trigger, for example a timer, may expire and "wake up" the user equipment, that is to say switch the primary radio transceiver 8 to the second state. There may be no special handling required by the CHSS in this case since the "location" of the user equipment in the Home location Register (HLR) 22 may be automatically updated when the user equipment 4 performs a location area update (LAU) to the new MSC in the location area (LA) in which it will camp.

Figure 6:
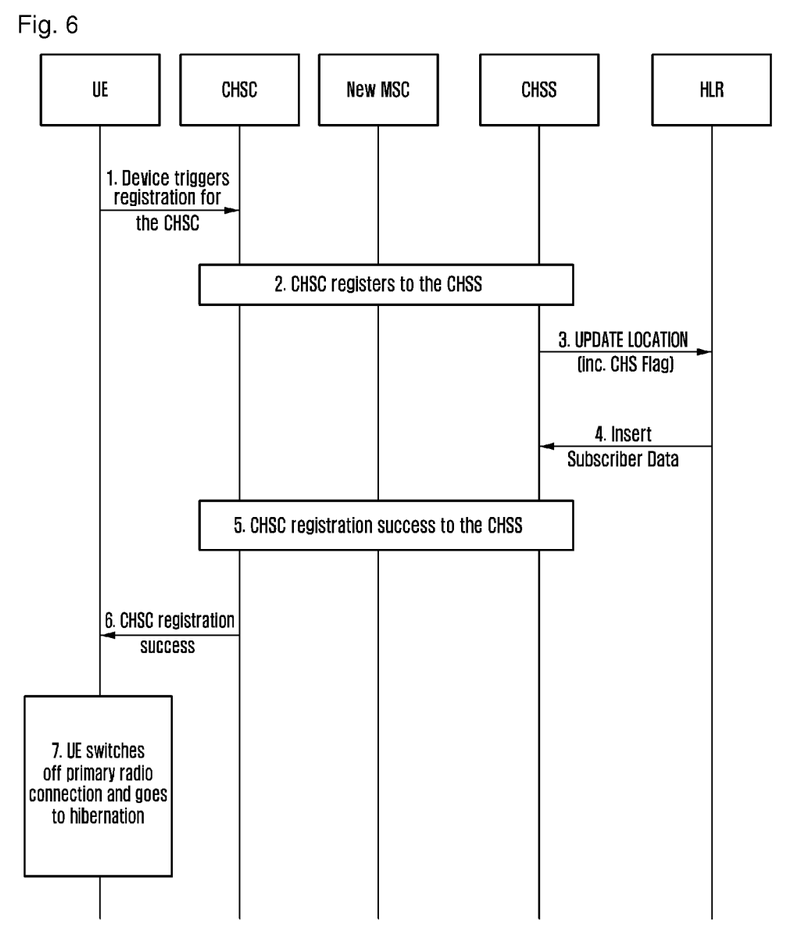
FIG. 6 is a diagram illustrating signal flow involved with registration in a circuit switched system according to an embodiment of the invention.

FIG. 6 illustrates an example of signal flow for the CHSC 18 registration to the CHSS 20 and the activation of the Call Handling Surrogate. The user equipment 4 sends a message to the CHSC 18 to activate the registration to the CHSS 20. The message from the CHSC to the CHSS can be for example SIP REGISTER reqMSst in one embodiment of the invention. The CHSS 20 may then perform a location area update (LAU) on behalf of the user equipment 4.

Figure 7:
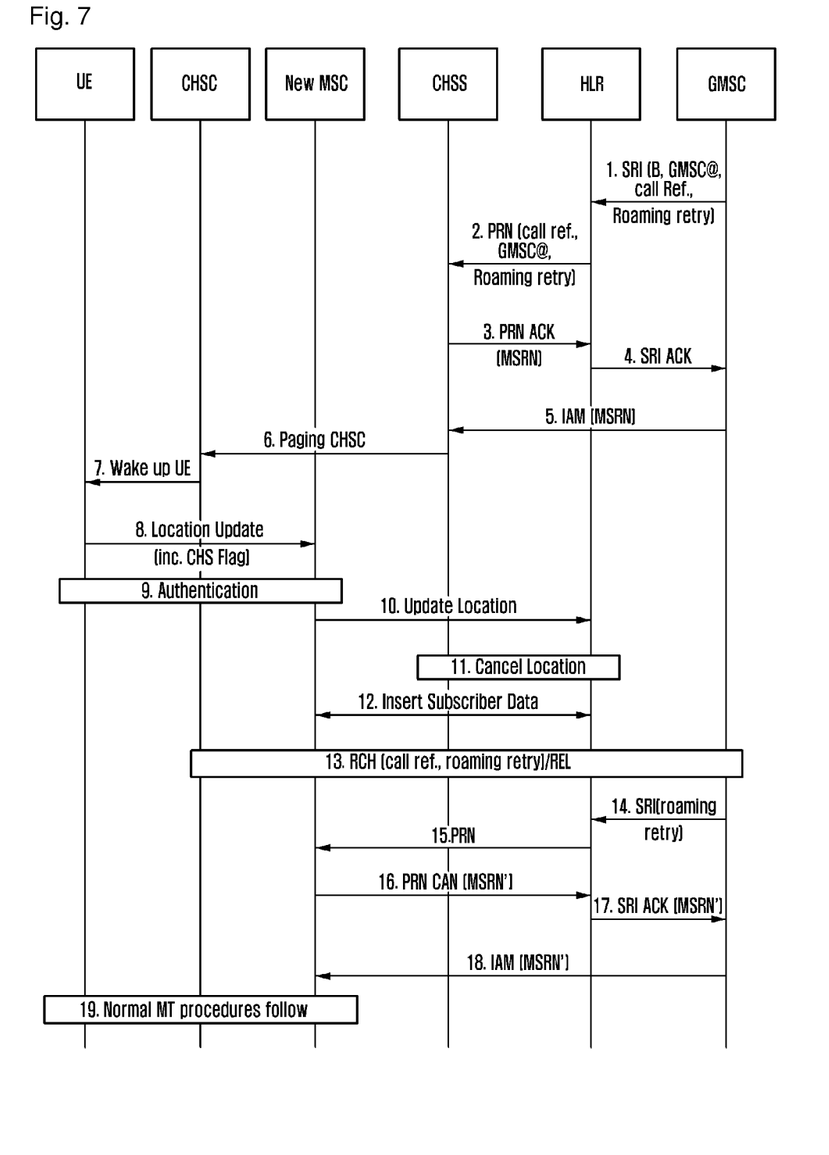
FIG. 7 is a diagram illustrating signal flow involved with a mobile terminated call in a circuit switched system according to an embodiment of the invention.

FIG. 7 shows an example of signal flow in the case of a mobile terminated (MT) call. In this embodiment, the existing feature of roaming retry may be utilized in order to avoid the MT call timeout and allow the user equipment to "wake up" from the interaction of the CHSC reactivate its primary radio transceiver 8 and camp back on to the network. Steps 1 to 19 may proceed as follows. At step 1, the GMSC handles the call as normally defined in the case of a MT call with Roaming Retry. At steps 2-3, the HLR having registered the location of the CHSS as the location during the registration procedure, sends a PRN towards the CHSS and the CHSS will provide its mobile station roaming number (MSRN) to the HLR. At step 4, the HLR returns the ACK to the SRI sent from GMSC. At steps 5-6, the GMSC in turn sends IAM to this MSRN targeting the CHSS. At step 7, the CHSC sends a "wake up" message to the user equipment, that is to say an indication that the primary radio transceiver 8 should be set to the second state. At steps 8-9, the user equipment reactivates its primary radio transceiver 8, camps on to the network and performs a LAU. The user equipment may send a Call Handling Surrogate (CHS) flag in this message that would allow the new MSC to understand that the call is terminated through the CHS. This allows the MSC to accelerate the authentication process for the user equipment and speed up the call termination. At steps 10-19, the LAU procedure and call termination using roaming retry is completed.

Figure 8:
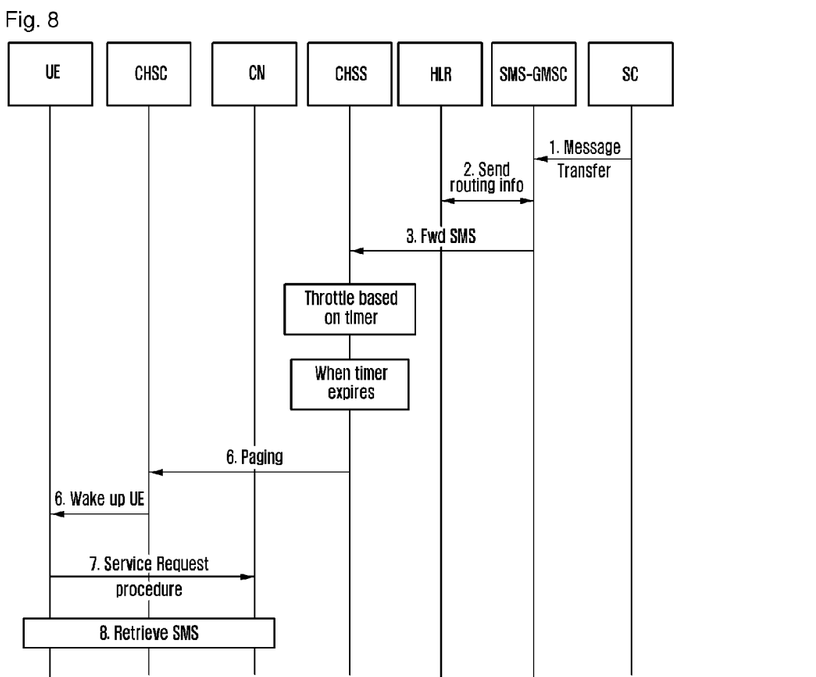
FIG. 8 is a diagram illustrating signal flow involved with a mobile terminated SMS message in a circuit switched system according to an embodiment of the invention (option A)
Figure 9:
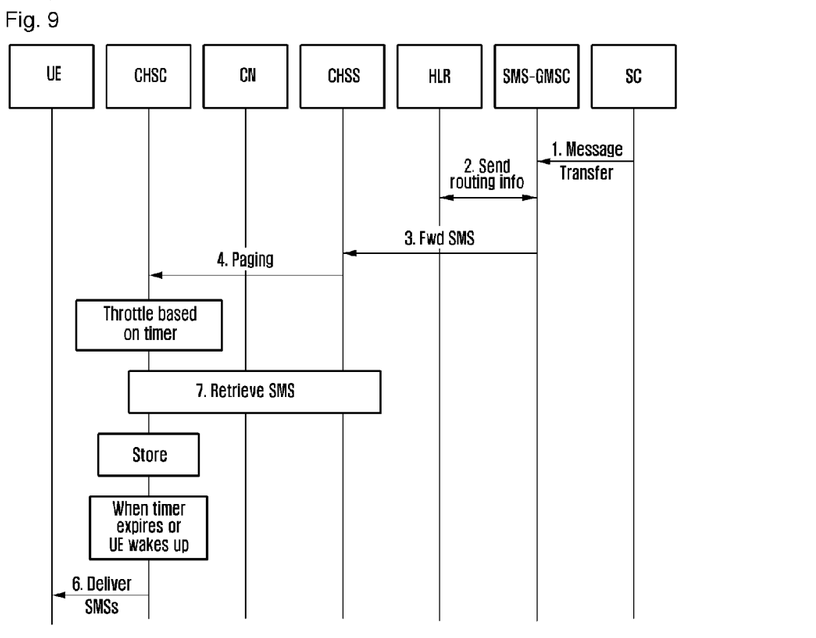
FIG. 9 is a diagram illustrating signal flow involved with a mobile terminated SMS message in a circuit switched system according to an embodiment of the invention (option B)

FIG. 8 and FIG. 9 illustrate two options for handling mobile terminated (MT) text messages Short Messaging Service messages (SMSs). Given that immediate handling of SMSs may be considered optional (e.g. during the night the user may choose not to have the SMSs delivered to the user equipment to avoid distraction) an embodiment of the invention restricts the flow, inhibiting or delaying the delivery of the SMS, that is to saying "throttling" the mobile terminated SMSs according to user preferences when the call handling surrogate (CHS) feature is activated. In one embodiment (Option A), throttling is performed in the CHSS as illustrated in FIG. 8. In this case the CHSS will be equipped with user preferences on how often the user wants the SMSs to be delivered to the CHSC and then to the user equipment itself. When there is a mobile terminated SMS, the CHSC will wake up the user equipment, that is to say set the primary radio transceiver 8 to the second state, and get the SMS delivered. In another embodiment, (option B) illustrated in FIG. 9, the CHSS always delivers the paging for SMS to the CHSC and it is the CHSC that does the throttling of the SMSs. The CHSC will store the SMSs locally and deliver to the user equipment when the throttling timer expires. In another embodiment, the throttling is performed in the CHSC and the CHSS does not page the CHSC, but instead leaves the paging timer to timeout. In this case the GMS-SMS will receive a reject and the SMS will be kept stored in Service Centre. When the user equipment autonomously "wakes up" or when the throttling timer expires, the SMSs are delivered to the user equipment as normal through the cellular radio network.

Figure 10:
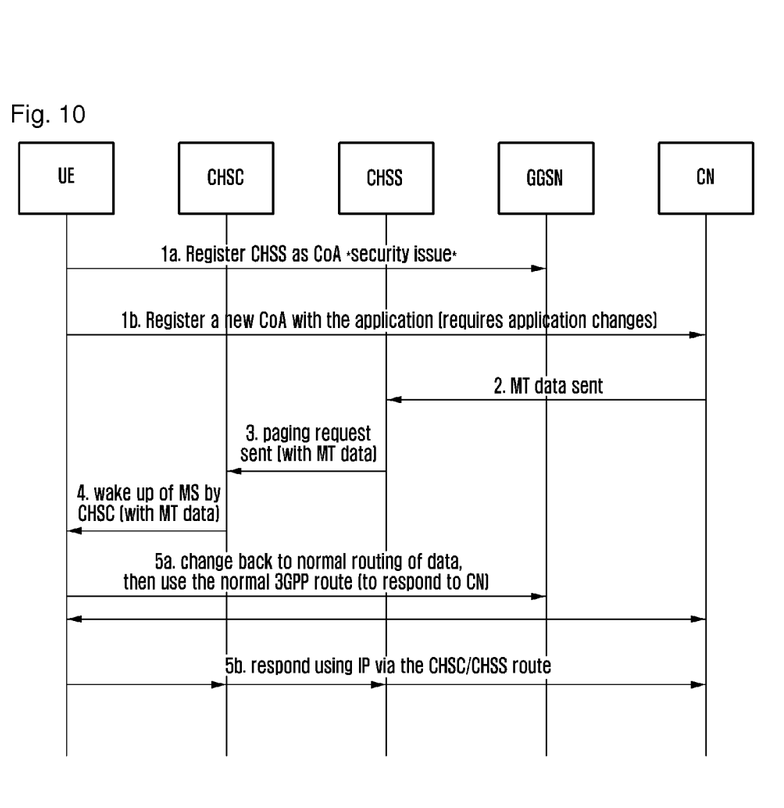
FIG. 10 is a diagram illustrating signal flow for using call handling surrogate mechanism according to an embodiment of the invention.

FIG. 10 illustrates an embodiment in which the user equipment receives MT terminated data connections. At step 1a, the user equipment may inform the PGW of a new destination address or alternatively, at step 1b, the user equipment may inform the application source of a new user equipment address to send the data. Alternatively, Step 1b could be handled by the user equipment contacting the CHSS, and the CHSS then logging in to the service at the CN (without requiring application changes). At step 2, the MT data arrives at the CHSS. At step 3, the CHSS sends a paging up message to the CHSC (a 'page'). At step 4, the CHSC wakes up the user equipment with the incoming MT data. At step 5a, the user equipment responds to the CN directly (after registering with the PGW/GGSN) or alternatively, the user equipment responds back to the CN by way of the route established in 1a.

An embodiment of the invention provides a method for handling calls in a mobile station, allowing the mobile station to enter hibernation mode (e.g. switch off the primary radio transceiver 8) by coupling the mobile station with a surrogate client function that registers itself with a network equipment and wakes up the mobile station when there is a mobile terminated call (a voice call, data or SMS). The surrogate client function may reside in an external device e.g. mobile phone charger, PC laptop or docking station or may be software module within the mobile station, for example an installable application. The surrogate client function coupled with the mobile station may communicate with the network element that handles the calls using Session Initiation Protocol (SIP) irrespective of whether the mobile station is upgraded to support SIP.

An embodiment of the invention provides a method for throttling SMSs and/or data calls destined for the mobile station through the apparatus that is coupled with the mobile station. This apparatus throttles the delivery of SMSs and/or data calls to the mobile station based on rules determined by user preferences.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for controlling a communication by a user apparatus comprising a user equipment and a device in a cellular wireless network, the method comprising:
   transmitting a registration message to activate a registration for a location of a user equipment to a server;
   setting a radio transceiver comprised in a first network interface included in the user equipment for communicating via the cellular wireless network to a disable state;
   receiving, through a second network interface included in the device which connects with the user equipment for communicating via a second network, a request message for communicating via the cellular wireless network using the radio transceiver based on the registration;
   identifying whether a timer has expired; and
   switching a state of the radio transceiver from the disable state to an enable state in response to detecting a signal which is transmitted from the device to the user equipment based on the request message, when the timer has expired.

2. The method according to claim 1, wherein the second network interface comprises a further radio transceiver for communicating via a wireless link to the second network.

3. The method according to claim 2, wherein the wireless link operates according to IEEE 802.11.

4. The method according to claim 1, wherein the second interface comprises a fixed line network interface for communicating via a fixed line to the second network.

5. The method according to claim 1, wherein the transmitting the registration message further comprises:
   transmitting an identifier of the user equipment for identifying the user equipment to the server.

6. The method according to claim 5, wherein the receiving the request message further comprises:
   receiving a paging signal for waking up the user equipment when a call addressed to the user equipment is received based on the identifier.

7. The method according to claim 1, wherein the receiving the request message further comprises:
   receiving a paging signal for waking up the user equipment when a data message is received.

8. The method according to claim 7, wherein the data message is a short messaging service (SMS) message.

9. The method according to claim 1, the method further comprising:
   receiving a client function to the user apparatus from the server; and
   receiving the request message for communicating using the client function of the cellular wireless network.

10. The method according to claim 9, the method further comprising:
    transmitting the registration message from the client function to the server for requesting registration; and
    registering the server with a mobility controller associated with the cellular wireless network to control calls related to the user equipment.

11. The method according to claim 9, wherein the client function is provided by a software application at the user equipment.

12. The method according to claim 1, the method further comprising:
    transmitting a switching message from the device to the user equipment for switching the state of the radio transceiver.

13. The method according to claim 1,
wherein the request message for communicating further comprises information on a type of communicating, and
wherein the switching the state of the radio transceiver further comprises:
  switching the state of the radio transceiver according to the type of communicating.

14. The method according to claim 12, wherein the device comprises a docking station for the user equipment.

15. The method according to claim 12, wherein the device comprises a battery charger for the user equipment.

16. The method according to claim 12, the method further comprising transmitting the switching message from the device to the user equipment using a digital European cordless telephone (DECT) link.

17. The method according to claim 1, the method further comprising:
  after switching the radio transceiver to the enable state, transmitting a re-registration message through a radio transceiver included in the first network interface to register the user equipment to a mobility controller associated with the cellular wireless network to control calls related to the user equipment.

18. The method according to claim 17, the method further comprising:
  performing a location area update to camp on to the cellular wireless network.

19. The method according to claim 17, the method further comprising:
  transmitting an indication from the user equipment to the mobility controller for indicating that the communication should be controlled on a priority basis.

20. The method according to claim 1, wherein the receiving the request message further comprises:
  receiving the request message when a delay time is expired at the server.

21. The method according to claim 20, wherein the delay time is associated with a type of communication.

22. The method according to claim 1, wherein the switching the state of the radio transceiver further comprises:
  switching the radio transceiver to the enable state when the request message is detected according to a delay setting associated with the communication.

23. The method according to claim 22, wherein the delay setting is associated with a type of communication.

24. A user apparatus comprising a user equipment and a device for controlling a communication in a cellular wireless network, said user apparatus comprising:
  a transmitter configured to transmit a message to activate a registration for a location of the user equipment to a server; and
  a controller configured to:
    set a radio transceiver comprised in a first network interface included in the user equipment for communicating via the cellular wireless network to a disable state,
    received, through a second network interface included in the device which connects with the user equipment for communicating via a second network, a request message for communicating via the cellular wireless network using the radio transceiver based on the registration,
    identify whether a timer has expired, and
    switch a state of the radio transceiver from the disable state to an enable state in response to detecting a signal which is transmitted from the device to the user equipment based on the request message, when the timer has expired.

25. A user equipment comprising a first network interface for communicating in a cellular wireless network connected with a device comprising a second network interface, the user equipment comprising:
  a transmitter configured to transmit a first message to activate a registration for a location of the user equipment to a server;
  a radio transceiver of the first network interface; and
  a controller configured to:
    receive a signal from the device based on the registration when the radio transceiver is set to a disable state, and
    switch the radio transceiver from the disable state to an enable state in response to detecting the signal which is transmitted from the device to the user equipment,
  wherein the device transmits the signal to the user equipment when the device receives a request message through the second network interface included in the device and the device identifies that a timer has expired.

* * * * *